United States Patent [19]

Duckworth et al.

[11] Patent Number: 4,674,463
[45] Date of Patent: Jun. 23, 1987

[54] INTERNAL COMBUSTION ENGINES

[75] Inventors: David K. Duckworth, East Hadon; Frederick W. Morley, Castle Donnington, both of United Kingdom

[73] Assignee: Cosworth Engineering Limited, Northampton, United Kingdom

[21] Appl. No.: 910,289

[22] PCT Filed: Mar. 1, 1984

[86] PCT No.: PCT/GB84/00068
§ 371 Date: Oct. 24, 1984
§ 102(e) Date: Oct. 24, 1984

[87] PCT Pub. No.: WO84/03538
PCT Pub. Date: Sep. 13, 1984

Related U.S. Application Data

[63] Continuation of Ser. No. 668,381, Oct. 24, 1984, abandoned.

[30] Foreign Application Priority Data

Mar. 2, 1983 [GB] United Kingdom ............... 8305803
Feb. 29, 1984 [EP] European Pat. Off. ........ 84301316.0

[51] Int. Cl.⁴ ............................................. F02B 47/08
[52] U.S. Cl. ..................................... 123/570; 123/568; 60/278; 60/320
[58] Field of Search ................. 123/570, 568, 569, 3; 60/278, 320, 279, 309, 310

[56] References Cited

U.S. PATENT DOCUMENTS 3,559,402  2/1971  Stone ........................................ 60/278
3,618,576  11/1971  Dixon ..................................... 123/570

FOREIGN PATENT DOCUMENTS

1327492  6/1971  United Kingdom .
1423862  2/1976  United Kingdom .
1517799  7/1978  United Kingdom .
2027485  5/1979  United Kingdom .

Primary Examiner—E. Rollins Cross
Attorney, Agent, or Firm—Parmelee, Miller, Welsh & Kratz

[57] ABSTRACT

A method of operating an internal combustion engine in which there is introduced into a combustion chamber, inert carrier gas, combustion supporting gas and fuel, the fuel is caused to combust in the combustion chamber and exhaust gas is exhausted from the combustion chamber wherein the carrier gas comprises a significant proportion of carbon dioxide and the exhaust gas is treated with water to remove from the exhaust gas and absorb in the water an amount of carbon dioxide generally equal to the quantity of carbon dioxide added by said combustion, and the thus treated exhaust gas is returned to the combustion chamber to provide the carrier gas. The carrier gas may have inert gas such as argon added thereto in proportions controlled such that the gamma value of the mixture of gases equals a predetermined value which may be approximately that of air.

29 Claims, 3 Drawing Figures

INTERNAL COMBUSTION ENGINES

This is a continuation of co-pending application Ser. No. 668,381 filed on Oct. 24, 1984, now abandoned.

This invention relates to internal combustion engines comprising a combustion chamber, delivery means to deliver inert carrier gas, combustion supporting gas and fuel into the combustion chamber, means to cause the fuel to combust in the combustion chamber and means to exhaust exhaust gas from the combustion chamber. More particularly, the invention relates to engines which are capable of operating efficiently where free-atmospheric air is not available, for example under water or where communication/connection with the atmosphere is undesirable such as in certain types of mine.

For example, in the operation of a diesel engine, a mixture of an inert carrier gas and a combustion supporting gas such as oxygen is delivered through an inlet valve to a combustion chamber in a cylinder of the engine and the mixture within the cylinder is compressed, producing a rise in temperature of the mixture which is sufficient to cause the fuel to combust, the fuel is then injected into the cylinder whereupon it combusts. Thereafter products of combustion of the fuel comprising, mainly, carbon dioxide and water vapour, are exhausted from the cylinder with the inert carrier gas and residual combustion supporting gas. The rise in temperature produced is dependent upon the compression ratio of the engine and on gamma, the ratio of specific heat at constant pressure ($C_p$) to the specific heat at constant volume ($C_V$). A normal diesel engine uses air, the nitrogen of the air constituting a majority of the inert carrier gas and the oxygen of the air constituting the combustion supporting gas and gamma is approximately 1.4.

Difficulty is encountered where atmospheric air is not freely available. In such circumstances the delivery of combustion supporting gas must be provided for from a contained supply thereof, such as oxygen from a bottle. It is also necessary to provide for delivery of the inert carrier gas but the delivery of carrier gas by such a means is preferably dispensed with.

DESCRIPTION OF PRIOR ART

Suggestions have been made (R. Thompson and A. Fowler of Newcastle Uviversity) initially to introduce air into the combustion chamber and then to remove from the exhaust gas the excess carbon dioxide produced by combustion of the fuel by the use of potassium hydroxide and to use the thus treated exhaust gases comprising essentially nitrogen, as the inert carrier gas with oxygen added thereto to provide the required proportion of combustion supporting gas, which is introduced into the combustion chamber in a subsequent cycle(s) of the engine.

However, the quantity of potassium hydroxide required to treat the exhaust gas to achieve a sufficiently high carbon dioxide removal rate can, under certain operating conditions, present a serious problem.

An object of the invention is to overcome this problem.

SUMMARY OF THE INVENTION

According to a first aspect of the invention, there is provided a method of operating an internal combustion engine in which there is introduced into a combustion chamber, inert carrier gas, combustion supporting gas and fuel, the fuel is caused to combust in the combustion chamber and exhaust gas is exhausted from the combustion chamber wherein the exhaust gas is treated with water to remove from the exhaust gas and absorb in the water an amount of carbon dioxide generally equal to the quantity of carbon dioxide added by said combustion, and the thus treated exhaust gas is returned to the combustion chamber to provide the carrier gas.

The invention solves the problem mentioned above (which arises by using potassium hydroxide to treat the exhaust gas) by treating with water.

Preferably, the carrier gas comprises a significant proportion of carbon dioxide.

One of the criteria governing the quantity of carbon dioxide soluble in water is not the total pressure at which the exhaust gas is treated but the partial pressure of each gas in the mixture. For example, in the case of a normal diesel engine, the partial pressure of the carbon dioxide content is about 10% of the total pressure, and it has been calculated that to remove most of this carbon dioxide, at a pressure of, for example, five atmospheres, the weight of water which would be needed would be about 500 times the weight of carbon dioxide and more at lower total pressure. This would present a serious difficulty in that the power requirements of the water management system and the size of the absorber would be high. Thus, we prefer to use a carrier gas which comprises a significant proportion of carbon dioxide so that the partial pressure of the carbon dioxide in the exhaust gas is increased to an extent where the removal of carbon dioxide by absorption water is practical.

Whilst the carrier gas may be "primed" with carbon dioxide, it is envisaged that the carrier gas will be initially unprimed, i.e. without any significant proportion of carbon dioxide, and thus initially may be inert components of air, but the proportion of carbon dioxide in the carrier gas will increase until equilibrium conditions are established in which the proportion of carbon dioxide will be dependent upon the quantity of water utilised and the pressure and temperature at which absorption takes place.

By a significant proportion of carbon dioxide, we mean more carbon dioxide than is present in air and preferably at least 20% carbon dioxide by volume of the total volume of carrier gas introduced into the combustion chamber.

It is preferred that the proportion of carbon dioxide in the carrier gas introduced into the combustion chamber when equilibrium conditions have been established will be in the range 35% to 50% by volume of the total volume of carrier gas, the proportion increasing in the exhaust phase, depending upon the fuel input to and load carried by, the engine (lower power lower extra CO2), so that the absorption operation is carried out on gas containing carbon dioxide in the range 45% to 60% by total volume of carrier gas being absorbed. As the carbon dioxide content increases, the efficiency of operation of the engine decreases and the maximum carbon dioxide content is typically 60% by volume of the total weight of carrier gas introduced into the combustion chamber.

Preferably the exhaust gas is cooled prior to absorption in order to achieve good solubility of the carbon dioxide. The exhaust gas may be cooled with the solvent water used for absorption, or may be cooled in a separate pre-cooler.

Preferably, the absorption takes place at a pressure greater than atmospheric to reduce the amount of water required, preferably in the range two to thirty atmospheres.

The engine may be aspirated at atmospheric pressure, i.e. a pressure of one atmosphere and the exhaust gas compressed prior to said treatment with water.

Alternatively, the engine may be aspirated at an elevated pressure above atmospheric pressure and line exhaust gas treated with said water at said elevated pressure.

Where the exhaust gas is treated at high pressure, typically above five to ten atmospheres, pre-cooling is necessary.

The engine may be operated in an open cycle by directing the exhaust gas to atmosphere and drawing the gas to be introduced into the combustion chamber from atmosphere.

Where the engine is aspirated at a pressure of one atmosphere to change the engine from closed to open cycle operation, the exhaust is directed to atmosphere and the gas to be introduced into the combustion chamber is drawn from atmosphere.

However, when the engine is aspirated at an elevated pressure above atmospheric pressure, to change the engine from closed to open cycle operation, initially the exhaust is directed to atmosphere to reduce the pressure in the circuit to atmosphereic pressure and then the gas to be introduced into the combustion chamber is drawn from atmosphere.

In either case, after open cycle operation, the engine may be changed to closed cycle operation by directing the exhaust gas to be treated with water and isolating the exhaust gas and gas to be introduced into the combustion chamber from atmosphere. Where no compressor is provided, the pressure obtaining in the closed circuit will be equal to the total pressure which results in the partial pressure of carbon dioxide being equal to that at which an amount of carbon dioxide equal to that produced by the engine is absorbed.

Where the engine is normally aspirated, i.e. aspirated at atmospheric pressure, the circuit advantageously comprises a compressor by which the exhaust gas is compressed on leaving the combustion chamber so that the exhaust gas is treated with water at a pressure greater than one atmosphere, for example, five atmospheres, to reduce the amount of water required to absorb the excess carbon dioxide, and an expander within which the exhaust gases are permitted to expand after treatment with water and before being returned to the combustion chamber.

It is preferred, however, to provide means so that the engine is aspirated at an elevated pressure above atmospheric pressure, for example two atmospheres, and the pressure in said circuit is likewise at said elevated pressure.

In this case, the same amount of fuel is delivered to the combustion chamber as if the engine were run at one atmosphere and so the amount of combustion supporting gas required to be fed to the combustion chamber can be reduced compared with that required when operating at atmospheric pressure. This is significant because it avoids any excessive loss of oxygen despite operation at above atmospheric pressure. More particularly, if the engine were run with 21% of oxygen, i.e. the normal oxygen content of free atmospheric air, then at full torque the residual oxygen in the exhaust would be about 12% of the exhaust gas. Since most natural sea water will already contain oxygen in solution equivalent to 21% of atmospheric pressure, i.e. 0.21 atmospheres, then 12% by volume of oxygen at two atmospheres is equivalent to 0.2 atmospheres partial pressure and hence only a small amount of oxygen would dissolve in the sea water and be lost.

However, if the engine is run at, for example, 25% of maximum torque, the oxygen content of the exhaust would be about 19% which, at two atmospheres, would produce a partial pressure of 0.38 atmospheres and hence considerable oxygen would dissolve in the sea water and be lost.

To reduce this loss to a small value, the engine is run at or near a constant oxygen exhaust concentration, for example 12%, which would involve negligible oxygen loss.

Accordingly, we prefer to provide an oxygen content control means to maintain a predetermined oxygen content is the exhaust gas. Thus, at low torque only relatively little oxygen is delivered to the combustion chamber, for example an oxygen content of approximately 14%, whilst at full torque more oxygen would be delivered to the combustion chamber, for example up to 21%, whilst maintaining a predetermined exhaust oxygen content of approximately 12%. Thus, delivery of combustion supporting gas to the combustion chamber may be controlled to maintain a predetermined content of combustion supporting gas in the exhaust gas to achieve a partial pressure of the combustion supporting gas in the exhaust gas approximately equal to the partial pressure of combustion supporting gas in the treatment water.

Alternatively, particularly where the engine is aspirated at atmospheric pressure, the oxygen content of the gas introduced into the combustion chamber may be controlled to provide a desired combustion supporting gas content in the inducted gas.

The amount of water available for treatment of the exhaust gas may be controlled in dependence upon the total pressure of the gas to be treated with water to control the amount of carbon dioxide removed from the exhaust gas.

It is desirable to provide an engine which is capable of operating under conditions in which free atmospheric air is not available with an efficiency similar to that achieved when operating normally.

While the problem of removal of the carbon dioxide generated by combustion may be reduced or overcome by utilising a carrier gas which itself contains a significant proportion of carbon dioxide, when nitrogen is the other main ingredient, the ratio gamma differs for such a mixture of gases considerably from that of air and would thus require an engine designed to operate at this gamma value, or would operate unsatisfactorily and/or inefficiently.

Accordingly, a further component may be introduced into the combustion chamber in an amount controlled such that the gamma value of the mixture of gases equals a predetermined value.

The carrier gas may comprise a first component provided by said carbon dioxide and a second component provided by the further component which may be provided by a second inert gas.

Another object of the invention is to permit of operation of an engine at a predetermined gamma ratio.

According to a second aspect of the invention, there is provided a method of operating an internal combustion engine in which there is introduced into a combustion chamber, inert carrier gas, combustion supporting gas and fuel, the fuel is caused to combust in the combustion chamber and exhaust gas is exhausted from the combustion chamber, wherein a further component is introduced into the combustion chamber in an amount which is controlled such that the gamma value of the mixture of gases equals a predetermined value.

The carrier gas may comprise a first component and said further component.

In both aspects of the invention:

The gamma value may be approximately that of air, preferably lying in the range 1.3 to 1.5.

The further component may be a monatomic inert gas or gases and may be one, or a mixture of at least two, of xenon, crypton, neon, helium, argon but advantageously is argon alone.

In the second aspect of the invention:

The first component may be carbon dioxide.

The carbon dioxide added to the carrier gas during combustion may be removed from the carrier gas by treatment of the exhaust gas to remove therefrom a proportion of carbon dioxide generally equal to the quantity of carbon dioxide added by said combustion, and the thus treated exhaust gas returned to the combustion chamber to provide the carrier gas.

According to a third aspect of the invention, there is provided on internal combustion engine comprising:
(a) a combustion chamber;
(b) delivery means to deliver inert carrier gas, combustion supporting gas and fuel into the combustion chamber;
(c) means to cause the fuel to burn in the combustion chamber;
(d) means to exhaust exhuast gas from the combustion chamber;
(e) a circuit through which some at least of the exhaust gas is ducted from the combustion chamber and returned to the combustion chamber, the circuit including an absorber in which the exhaust gas is treated with water to remove carbon dioxide from the exhaust gas.

The circuit may include a cooler in which the exhaust gas is cooled.

The circuit may include means to cause the exhaust gas to be treated at a pressure greater than atmospheric pressure.

Preferably said delivery means is adapted to deliver combustion supporting gas to a manifold where combustion supporting gas is mixed with the treated exhaust gas prior to passage into the combustion chamber.

Supply means may be provided to supply a further component (which is advantageously a monoatomic gas, preferably argon or a mixture of monatomic gases) to the combustion chamber, and means to control the amount of the further component supplied by the supply means that the gamma value of the mixture of gases is adjusted.

The supply means may supply the further component to said manifold to be mixed with the combustion supporting gas and the treated exhaust gas prior to passage into the combustion chamber.

According to a fourth aspect of the invention there is provided an internal combustion engine comprising
(a) a combustion chamber;
(b) delivery means to deliver inert carrier gas, combustion supporting gas and fuel into the combustion chamber;
(c) means to cause the fuel to burn in the combustion chamber;
(d) means to exhaust exhaust gas from the combustion chamber;
(e) supply means to supply a further component to the combustion chamber;
(f) control means to control the amount of the further component supplied by the supply means to adjust the gamma value of the mixture of gases.

Preferably, according to both of the third and fourth aspects of the invention, the engine comprises a sensor means responsive to a property of exhaust gas returned to the combustion chamber (which property may be a physical property or may be the composition of the gas) and means adapted to vary the rate at which the further component is delivered by the supply means under the control of the sensor means to control the proportions of the inert carrier gas and the further component such that the gamma value of the gas delivered to the combustion chamber equals a predetermined value.

Preferably the sensor means is adapted to control the rate at which the further component is added to the exhaust gas to provide, when combustion supporting gas has been added thereto, a gas having a gamma value approximately that of air.

The engine may be a diesel engine or a gas turbine, and in each case, particularly when the engine is operating at relatively high pressure in closed cycle, i.e. above about five to ten atmospheres, the engine may comprise a heat exhanger by which heat is extracted from the exhaust gases leaving the combustion chamber and returned to the treated exhaust gases which comprise the carrier gas prior to re-entering the combustion chamber.

BRIEF DESCRIPTION OF THE DRAWINGS

There will now be given a detailed description, to be read with the reference to the accompanying drawing, of three internal combustion engines which are preferred embodiments of this invention, and which have been selected for the purposes of illustrating the invention by way of example. In the accompanying drawings.

DESCRIPTION OF THE PREFERRED EMBODIMENT

Figure 1:
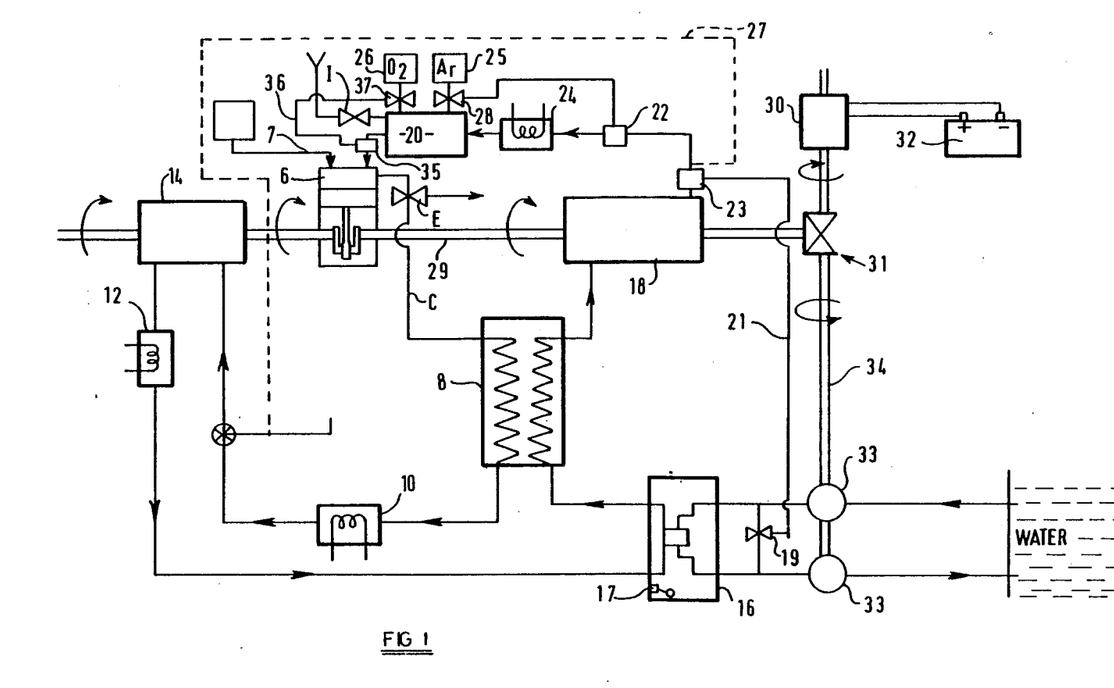
FIG. 1 is a schematic illustration of a first embodiment of the invention, as applied to a diesel engine.

The internal combustion engine which is the first embodiment of this invention has been devised for operating both under conditions of normal aspiration at atmospheric pressure and in environments where communication with free-atmosphere is undesirable, or under water, in which latter context the engine will hereinafter be described. The engine comprises a piston/cylinder unit 6 designed to operate on diesel cycle and hence having a combustion chamber and an inlet valve or valves through which a mixture of gases containing oxygen are admitted to the cylinder, and an exhaust valve or valves through which exhaust gas is ducted from the cylinder. The engine also comprises means 7 to inject fuel into the cylinder, and a circuit C through which some at least of the exhaust gas is ducted from the combustion chamber and returned to the cylinder, said circuit including a heat exchange unit 8, first and second cooling units 10 and 12, a compressor unit 14, an absorber unit 16, an expansion unit 18, and a cooler 24.

In the operation of the engine in a non-atmospheric or closed cycle, oxygen from a high pressure store thereof is delivered to a manifold 20 at atmospheric pressure, and is ducted into the engine cylinder together with carrier gas. The gas charge is compressed within the engine cylinder, causing the temperature of the gas to increase, and fuel is injected, producing combustion of the fuel. Exhaust gas is ducted from the combustion chamber through the heat exchange unit 8, in which the temperature of the exhaust gases is reduced, and through the first cooling unit 10 to the compressor unit 14, at which the pressure of the exhaust gases is increased. The compressed exhaust gases are passed through the second cooling unit 12 to the absorber unit 16, in which the exhaust gases are treated with sea water, at a pressure of about five atmospheres. The absorber may be of any suitable type but preferably comprises a rotor provided with wire mesh or other material having a high surface area to volume ratio through which the water is thrown radially outwardly by centrifual force whilst the exhaust gas is caused to pass therethrough in counterflow. This absorber achieves rapid absorption into the sea water and is compact. The absorber unit 16 is provided with a level control 17 to ensure that the absorber is not flooded or run below a predetermined water level.

The thus treated exhaust gas is passed through the heat exchange unit 8, at which the temperature of the gas is increased, and through an expansion unit 18 within which the exhaust gas is permitted to expand, through a sensor unit 22 in which the composition of the gas is measured, through a third cooling unit 24, and back into the manifold 20 in which argon and oxygen are added to the treated exhaust gas from reservoirs 25, 26 respectively.

The sensor unit 22 is arranged to provide a control signal to a metering valve 28 which meters the amount of argon fed to the manifold 20 from the reservoir 25 to ensure that the proportion of argon in the inducted gas provides the desired ratio of specific heats gamma. In the present example, the sensor 22 comprises a compressor having a pressure ratio greater than 2:1 in which the exhaust gas is compressed followed by means to pass the compressed exhaust gas through a convergent/divergent passage, together with means to measure the inlet pressure and throat pressure in the passage. Changes of gamma changes the ratio of these two pressure (absolutely) and comparison means are provided to compare the two pressures and to produce an output in relation thereto which controls the valve 28.

The change of ratio which occurs is very small and thus highly accurate transducers and comparison electrical circuits are provided.

During an initial stage in the operation of the engine on closed cycle, the proportions of carbon dioxide and argon in the circulating gas will increase, and the proportion of nitrogen will decrease until an equilibrium condition is established (dependent upon the characteristics of the absorption process) in which the rate at which carbon dioxide is removed by absorption in the water is equal to the rate at which carbon dioxide is added during the combustion process.

The supply of air for the third initial charge for closed cycle operatin may be achieved by supplementary supply bottles, or air may be ducted from available free-space in the engine compartments, of course once closed cycle ooperation has started, further air is not required but only a continual supply of oxygen. If engine is shut down from a closed cycle system in balanced operation, the initial charge is suitable for another start-up without additions.

Alternatively and preferably operation of the engine is initiated in the atmosphere on "open cycle", in which the exhaust gases are vented to atmosphere via two-way valve E, and air is drawn into the manifold from atmosphere via two-way valve I, and then switched over to closed cycle, in which an increasing proportion of exhaust gas is ducted to the absorber by progressively closing valve E to atmosphere, causing, in consequence, an increasing proportion of treated exhaust gases to be returned to the manifold through the expander with a corresponding closing of valve I to atmosphere. When change over to closed cycle has been completed, the engine may be submerged to its intended location. The rate of switch-over is limited by the rate at which argon can be fed in to maintain the desired 5:3 volume ratio of argon to carbon dioxide, otherwise the ignition can be affected in a diesel engine, and it could stop. Therefore, the change-over rate is affected by power demand during the opeation until the argon level can reach that desired.

When it is desired to terminate closed cycle operation, exhaust valve E is opened to atmosphere and then inlet valve I, if desired both valves may be opened at the same time.

Because the carrier gas is rich in carbon dioxide, it is possible, and may be desirable, to pass only a proportion of the cooled exhaust gas through the compressor absorber and expander and still have the correct mixture entering the engine, by absorbing a greater proportion of carbon dioxide from the smaller quantity of exhaust gas. Thus a duct 27 may be provided (shown in dotted lines in FIG. 1) between the cooler 10 and the sensor unit 22. In this manner a reduction in compressor and expander size and weight may be obtained.

Both the compressor unit 14 and the expander unit 18 are drivingly connected to a driveshaft 29 driven by the engine, which driveshaft 29 also drives a generator 30, through a gearbox 31, conveniently through a releasable coupling (not shown). Power may be derived from the engine, either directly by a power take-off (not shown), or in the form of electricity from the generator. Conveniently the generator 30 is connected to a battery 32, and may be operated as a starter motor. Pumps 33 for the absorber unit 16 are also driven from the engine driveshaft 29 via the gearbox 31 and a shaft 34.

In order to control the amount of water circulated through the absorber 16 by the pumps 33, a motorised by-pass valve 19 is provided which is adjusted in accordance with a signal provided along a line 21 from a further sensor 23 through which the treated exhaust gas is passed after leaving the expander 18. The sensor 23 measures the total pressure in the gas circuit C and increases the water flow through the absorber 16 if the pressure exceeds a predetermined pressure and reduces the water flow if the pressure falls below a predetermined pressure so as to control the amount of carbon dioxide removed from the exhaust gas.

The gas leaving the manifold 20 to enter the cylinder 6 passes through a third sensor unit 35 which provides a control signal via line 36 to a metering valve 37 which controls the amount of oxygen fed to the manifold 20 from the reservoir 26 to meter the correct amount of oxygen into the carrier gas. The sensor unit 35 comprises a conventional sensor for detecting oxygen content and may be provided with means to adjust the oxygen supply in accordance with operating parameters of the engine. Alternatively, the sensor may be positioned to sense the oxygen content of the exhaust gas and control the valve 37 to provide a desired oxygen content in the exhaust gas as to be described with reference to FIG. 2.

The engine which is the first embodiment of this invention is designed to operate in air, or a charge which simulates air, that is with a mixture of charge gases having a gamma ratio of approximately 1.4.

Figure 2:
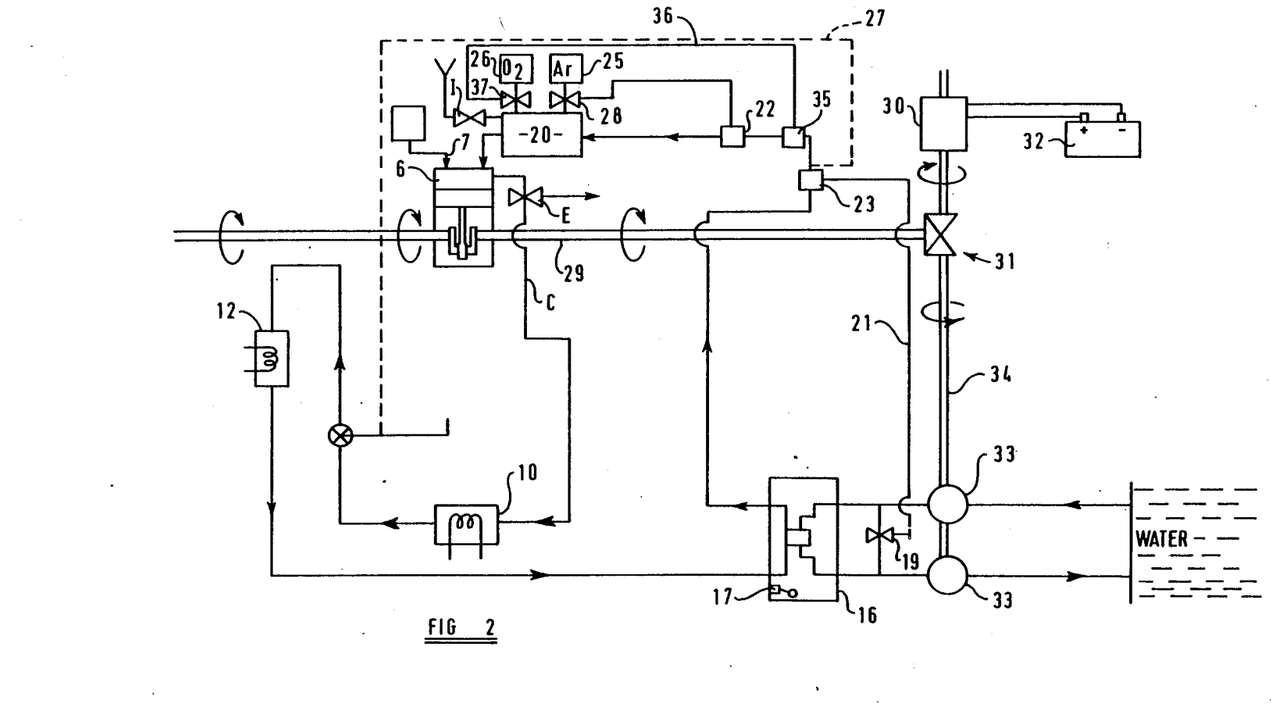
FIG. 2 is a schematic illustration similar to FIG. 1 but showing a modification of the engine shown in FIG. 1.

FIG. 2 shows a second embodiment of the invention, which is preferred and is a modification of the first embodiment of the invention. The same reference numerals have been used in FIG. 2 as are used in FIG. 1 for corresponding parts.

In this embodiment, the engine is operated so that the pressure in the closed circuit is above atmospheric pressure. This permits of elimination of the heat exchanger 8, the compressor 14, the expander 18 and the cooler 24. In other respects, the second embodiment is as the first embodiment except that during operation of the engine in the non-atmospheric cycle, the gases delivered to the combustion chamber are delivered thereto under pressure which is above atmospheric pressure, in the present example, at a pressure of two atmospheres.

Assuming that the engine is operating on an atmospheric cycle, drawing charge from atmosphere which is introduced into the combustion chamber at atmospheric pressure, then, when it is desired to initiate closed cycle operation, the exhaust valve E is operated to direct exhaust gas to the absorber 16 and to close the exhaust to atmosphere, and then the valve I is operated to close the inlet to atmosphere. The pressure in the system increases due to carbon dioxide generation until the pressure attains the desired operating pressure at which the partial pressure of the carbon dioxide in the exhaust gas is such that the carbon dioxide is absorbed at the same rate as it is generated, thereby preventing further pressure increase. The rate of pressure increase in the closed circuit depends upon the rate of carbon dioxide generation and so will be high when the engine is operating at high load and vice versa.

When it is desired to terminate closed cycle operation, the exhaust valve E is opened to atmosphere thus dropping the pressure in the circuit C to atmospheric pressure and then the valve I is opened.

The exhaust gas is ducted from the combustion chamber directly to the cooler 10 and into the absorber 16 at a pressure of two atmospheres so that it is treated with sea water at this pressure which, whilst requiring more water than is required in the case of the first embodiment where the exhaust gas is treated at a pressure of five atmospheres, still permits of a practical size of absorber 16. Problems of oxygen loss are avoided by controlling the oxygen content so that the partial pressure of the oxygen in the exhaust gas is approximately equal to the partial pressure of oxygen in the water used for treating, for example sea water, where the engine is used in a marine application. The treated exhaust gas is then returned to the engine cylinder at a pressure of two atmospheres via the sensor units 22, 23 and 35.

The sensor units 22 and 23 work as described above in connection with the first embodiment except that in this embodiment, the sensor unit 23 is arranged so that the predetermined pressure is two atmospheres absolute.

In this embodiment, the sensor unit 35 is positioned to sense the oxygen content of the exhaust gas and provides a control signal to ensure that a (variable) amount of oxygen is added to the carrier gas so that the proportion of oxygen in the exhaust is maintained substantially constant at the desired level to avoid excessive oxygen solution in the water in the absorber 16. In the present example, the sensor unit 35 controls the valve 37 to ensure that the proportion of oxygen in the exhaust gas is approximately 12% which, as mentioned above, at an operating pressure of two atmospheres provides a partial pressure of oxygen of approximately 0.24 atmospheres which in view of the oxygen content of the sea water in which the engine is intended to operate corresponding to an atmospheric oxygen partial pressure of 0.21 atmospheres ensures that there is relatively little oxygen loss.

Figure 3:
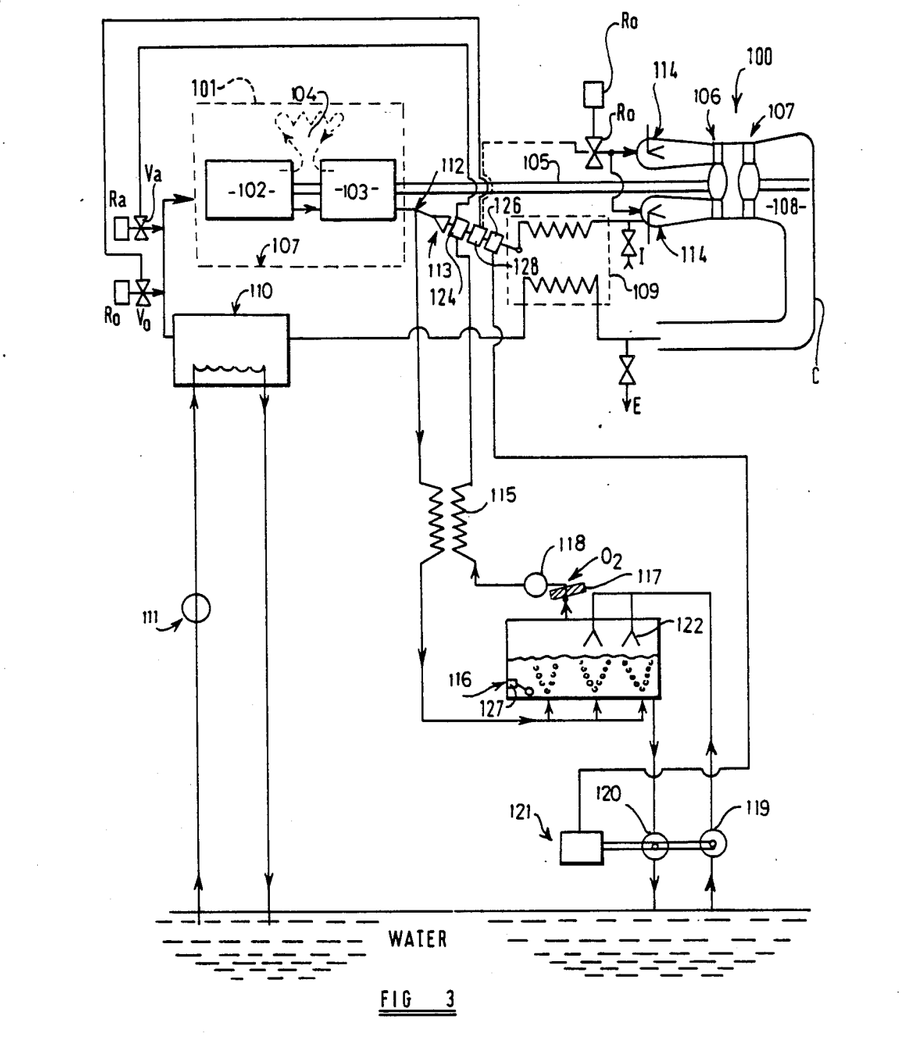
FIG. 3 is a schematic illustration of a third embodiment of the invention, as applied to a gas turbine.

A third embodiment relates to the application of the present invention to a gas turbine, comprising compressor means, heat exhanger means, combustion means, turbine expander means, heat exchanger means, and cooler means in flow sequence. The compressor means may be multistage with intercooler, and the heat exchanger means is optional. Such a system normally draws in atmospheric air and rejects the exhaust gases, typically containing some 6% of $CO_2$ to atmosphere. Such devices are primarily suitable for large power unis 10,000 hp plus, where the weights of large diesel engines become relatively excessive.

For example in gas turbine engines utilised in submarine environments one requirement is that the engine should be capable running on atmospheric air.

Thus in the application of the present invention, the exhaust from the turbine or its following heat exchanger (if fitted) is cooled by indirect thermal contact with sea water, and returned to compressor inlet, at which point oxygen needed to continue combustion, and argon to control the argon content are conveniently added through metering valves $V_o$, $V_a$ from reservoirs $R_o$, $R_a$. The excess carbon dioxide must be rejected, and this is done by separating part of the gas flow at the outlet of the gas compressor, which part is then passed through a heat exchanger to conserve heat, and exposed at full compressor pressure to sea water in the absorber. The carbon dioxide dissolves preferentially in the sea water, and the remainder of the gas is pumped back through the pump heat exchanger to region the main flow prior to the main flow heat exchanger (if fitted), or if not, to the inlet of the combustion chamber.

Thus, by adding a monatomic gas (such as argon) to the circulating flow such that $\frac{2}{3}$ is argon and is carbon dioxide, together with oxygen for combustion, then both the gamma ratio and heat capacities by volume of the circulating gas is close to the values for air, and the engine will run equally well on the carbon dioxide/argon mixture, so that a change over is simple and the engine compressors and turbines are unchanged. It should also be noted that the carbon dioxide absorber is run at full compressor pressure and only a part of the circulating flow needs to pass through the absorber.

A gas turbine may run at twelve to twenty atmospheres for absorption without increasing the inlet pressure above one atmosphere, i.e. its normal condition.

Thus as illustrated in FIG. 3, the engine 100 comprises a compressor means 101, which may consist of one or two sections 102 and 103, advantageously with an optional intercooler 104, which is drivingly connected by a shaft 105 to a high pressure turbine or turbines 106. The gas flow from turbine 106 is ducted to a power turbine 107 and through a circuit C comprising a duct 108 extending to an optional heat exchanger 109, by which some exhaust heat is removed, and then to a cooler 110 where it is cooled to near sea water temperature by sea water pumped through the cooler 110 by pump 111. The cooled gas then enters the compressor means 101 and emerges at high pressure at the exit 112 where a proportion passes through duct 113 to the high pressure inlet of heat exchanger 109, where it absorbs heat from the exhaust gases, and passes into a combustion chamber 114, wherein fuel is injected and burned, and passes to the inlet high pressure turbine 106.

The other fraction of gas emerging from compressor 101 at exit 112 passes to another heat exchanger 115 which reduces the temperature further, and is then injected into the bottom of the absorber 116, where it is brought into intimate contact with sea water to dissolve out the carbon dioxide. The gas is cleaned from salt water in a cleaner/scrubber 117, and is then returned to the circuit by compressor 118, and passes back through the opposite paths of the heat exchanger 115 to the engine where this fraction rejions the fraction of the gas flowing through duct or manifold 113 to the high pressure entry to heat exchanger 109. Alternatively all the gas may pass through the absorber.

The absorber 116 is also provided with a level control 127 corresponding to the level control 17 of the first two embodiments.

Sea water is pumped through the absorber 116 by a pump 119 which collects power from the high pressure sea water in its pressure reduction, passes through the absorber water distribution system shown as sprayers 122, collects at the bottom of the absorber, and is pumped away by a pump 120.

Sensor units 124, 126 and 128 are provided corresponding to the sensor units 22, 23 and 35 of the first two embodiments to control argon supply, water supply and oxygen supply respectively as previously described in connection with the first two embodiments. Except, of course, the oxygen supply is controlled to maintain a desired oxygen proportion at the inlet to the gas turbine analogously to the oxygen control afforded in the first embodiment.

Alternatively, the reservoir Ro and valve Vo may be positioned as shown in chain dotted line and oxygen fed directly into the combustion chamber. In this case, the oxygen content in the closed circuit can be low, consistent with permitting sensing of the oxygen content.

Further alternatively, the sensor 128 can be positioned in the duct 113 upstream of the return line from the absorber 116 and be arranged to control an oxygen control valve, similar to the valve Vo, but positioned downstream of the return line from the absorber 116, for example where the sensor 128 is shown in FIG. 3.

The engine is controlled in conventional manner by altering fuel flow inlet to the combustion chamber 114 to provide the desired path, this flow being limited as required by, for example, speed goveners of known type.

Change over between open and closed cycles operation is as described for the first embodiment.

In all the embodiments described above, the water vapour generated at combustion is condensed in the absorber and/or cooler, where provided and so is removed from the exhaust gas.

In all the embodiments described above, the ratio of argon to carbon dioxide is calculated to have the same ratio of specific heat as air in the relevant temperature range of compression in the engine cylinder, i.e. between 100° C. and 500° C. For example, in practical terms 3 moles of carbon dioxide to 5 moles of argon or helium make 8 moles of a mixture which, when oxygen is added, behaves in all practical respects like air.

The ratio of the partial pressures of carbon dioxide to argon is the molar ratio, i.e. 3:5. The ratio of carbon dioxide removal to argon removal is equal to the solubility ratio $\times 3/5$, i.e. $(76.6/2.4) \times (3/5) = 19.1$.

Thus the ratio of argon to carbon dioxide in the treated gas is 5:3, equal to the rate at which argon and carbon dioxide is delivered to the combustion chamber. In other words, the carbon dioxide added to the carrier gas by the combustion process has been removed.

Whilst the desired ratio of argon to $CO_2$ is 5:3 for best operation, other ratios are acceptable depending on the engine design and fuel quality for lower ratios, and depends on the ruggedness of construction and pressure operating levels of the engine for higher ratios.

In general the operation of the power units is self-regulation, dependent upon the operation of the absorber unit, in as much as, if the proportion of carbon dioxide in the carrier gas increases, the partial pressure of the carbon dioxide in the exhaust gas increases commensurately, increasing the rate at which carbon dioxide is removed by the absorbing process.

However some argon will be removed by the absorber, and desirably means are provided to apply argon at a small rate, conveniently entering the manifold 20, to replace this lost argon. Advantageously the rate of such addition of argon to the manifold is controlled by the sensor unit 22 to a desired rate.

Although argon has been described above as the inert gas, the inert gas may comprise one, or a mixture of at least two of, xenon, crypton, neon, helium, argon.

Whilst the invention has been described above in relation to diesel engines and gas turbines, it is to be appreciated that the invention is not limited in this respect, and may be used to advantage in other types of engine. Furthermore, the exhaust gas may be treated at any desired pressure which in practical terms can lie between atmospheric pressure and thirty atmospheres.

If desired the composition of the inducted gas may be such as to achieve any desired ratio gamma including ratios gamma outside the range 1.3 to 1.5.

The above described embodiments may be modified by omitting the above described means for removing carbon dioxide with water. If desired, carbon dioxide may be removed by other means, for example with potassium hydroxide.

If desired, gas other than oxygen may comprise the combustion supporting gas, for example hydrogen peroxide, or a mixture of suitable combustion supporting as may be provided with suitable supply and control means analogous to those described above for oxygen.

In this description and claims the proportion of carbon dioxide in the carrier gas is expressed in % by volume of the total volume of carrier gas.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof.

We claim:

1. A method of operating an internal combustion engine in which there is introduced into a combustion chamber, inert carrier gas, combustion supporting gas and a monatomic inert gas, to provide a mixture thereof in the combustion chamber, the monatomic gas being introduced into the combustion chamber in an amount controlled such that said mixture has a gamma value lying in a predetermined range, and fuel is introduced into the combustion chamber, the fuel is caused to combust in the combustion chamber and exhaust gas is exhausted from the combustion chamber, at least part of the exhaust gas is treated with water to remove from the exhaust gas and absorb in the water an amount of carbon dioxide generally equal to the quantity of carbon dioxide added by said combustion, and the thus treated exhaust gas is returned to the combustion chamber to provide the carrier gas.

2. A method according to claim 1 wherein the proportion of carbon dioxide in the carrier gas, when equilibrium conditions have been established, lies in the range 20% to 60%.

3. A method according to claim 2 wherein the proportion of carbon dioxide in the carrier gas lies in the range 35% to 50%.

4. A method according to claim 1 wherein the exhaust gas is cooled prior to absorption.

5. A method according to claim 1 wherein the absorption takes place at a pressure greater than atmospheric.

6. A method according to claim 5 wherein the engine is aspirated at a pressure of one atmosphere, and the exhaust gas is compressed prior to said treatment with water.

7. A method according to claim 5 wherein the engine is aspirated at an elevated pressure above atmospheric pressure and the exhaust gas is treated with said water at said elevated pressure.

8. A method according to claim 1 wherein the engine can be operated in an open cycle by directing the exhaust gas to atmosphere and drawing the gas to be introduced into the combustion chamber from atmosphere.

9. A method according to claim 1 wherein the amount of water available for treatment of the exhaust gas is controlled in dependence upon the total pressure of the gas to be treated with water to control the amount of carbon dioxide removed from the carrier gas.

10. A method according to claim 1 wherein the gamma value lies in the range 1.3 to 1.5.

11. A method according to claim 1 wherein the further component is a monoatomic inert gas or gases.

12. An internal combustion engine comprising:
(a) a combustion chamber;
(b) delivery means to deliver inert carrier gas, combustion supporting gas and a monatomic inert gas, to provide a mixture thereof in the combustion chamber;
(c) delivery means to deliver fuel into the combustion chamber;
(d) means to cause the fuel to burn in the combustion chamber;
(e) means to exhaust gas from the combustion chamber;
(f) a circuit through which the exhaust gas is ducted from the combustion chamber and returned to the combustion chamber, the circuit including an absorber in which at least some of the exhaust gas is treated with water to remove carbon dioxide from the exhaust gas; and
(g) control means to control the amount of the monatomic inert gas supplied by the delivery means such that said mixture of gases have a gamma value lying in a predetermined range.

13. An engine according to claim 12 wherein the circuit includes means to cause the exhaust gas to be treated at a pressure greater than atmospheric pressure.

14. An engine according to claim 12 wherein said delivery means is adapted to deliver combustion supporting gas to a manifold where combustion supporting gas is mixed with the treated exhaust gas prior to passage into the combustion chamber.

15. An engine according to claim 12 wherein the engine is aspirated of atmospheric pressure, the circuit comprising a compressor by which the exhaust gas is compressed on leaving the combustion chamber so that the exhaust gas is treated with water at a pressure greater than one atmosphere, and an expander within which the exhaust gas is permitted to expand after treatment with water and before being returned to the combustion chamber.

16. An engine according to claim 12 wherein means are provided so that the engine is aspirated at an elevated pressure above atmospheric pressure, and the pressure in said circuit is likewise at said elevated pressure.

17. An engine according to claim 12 wherein said delivery means is adapted to deliver combustion supporting gas to a manifold where combustion supporting gas is mixed with a treated exhaust gas prior to passage into the combustion chamber and the supply means supplies the further component to said manifold to be mixed with the combustion supporting gas and the treated exhaust gas prior to passage into the combustion chamber.

18. An engine according to claim 12 wherein the engine comprises a sensor means responsive to a property of exhaust gas returned to the combustion chamber and means adapted to vary the rate at which the further component is delivered by the supply means under the control of the sensor means to control the proportions of the inert carrier gas and the further component such that the gamma value of the gas delivered to the combustion chamber equals a predetermined value.

19. An engine according to claim 18 wherein the sensor means is adapted to control the rate at which the further component is added to the exhaust gas to provide, when oxygen has been added thereto, a gas having a gamma value approximately that of air.

20. An engine according to claim 12 wherein the engine is a diesel engine.

21. An engine according to claim 12 wherein the engine is a gas turbine engine.

22. A method according to claim 11 wherein the further component comprises one, or a mixture of at least two selected from the group consisting of xenon, crypton, neon, helium, argon.

23. A method according to claim 1 wherein the engine is a diesel engine.

24. A method according to claim 1 wherein the engine is a gas turbine engine.

25. An engine according to claim 12 wherein said supply means for said further component comprises a reservoir for a monatomic inert gas or gasses.

26. An engine according to claim 12 wherein said supply means for said further component comprises a reservoir of one, or a mixture of at least two of, xenon, crypston, neon, helium, argon.

27. An engine according to claim 12 wherein said control means is to control the amount of the further component such that said gamma value lies in the range 1.3 to 1.5.

28. A method of operating an internal combustion engine in which there is introduced into a combustion chamber, inert carrier gas, combustion supporting gas and a monatomic inert gas, to provide a mixture thereof in the combustion chamber, the monatomic gas being introduced into the combustion chamber in an amount controlled such that said mixture has a gamma value lying in a predetermined range, and fuel is introduced into the combustion chamber, the fuel is caused to combust in the combustion chamber and exhaust gas is exhausted from the combustion chamber, at least part of the exhaust gas is treated to remove from the exhaust gas an amount of carbon dioxide generally equal to the quantity of carbon dioxide added by said combustion, and the thus treated exhaust gas is returned to the combustion chamber to provide the carrier gas.

29. An internal combustion engine comprising:
(a) a combustion chamber;
(b) delivery means to deliver inert carrier gas, combustion supporting gas and a monatomic inert gas, to provide a mixture thereof in the combustion chamber;
(c) delivery means to deliver fuel into the combustion chamber;
(d) means to cause the fuel to burn in the combustion chamber;
(e) means to exhaust exhaust gas from the combustion chamber;
(f) a circuit through which the exhaust gas is ducted from the combustion chamber and returned to the combustion chamber, the circuit including an absorber in which at least some of the exhaust gas is treated to remove carbon dioxide from the exhaust gas; and
(g) control means to control the amount of the monatomic inert gas supplied by the delivery means such that said mixture of gases has a gamma value lying in a predetermined range.

* * * * *